United States Patent
Kawaguchi et al.

(10) Patent No.: US 12,404,383 B2
(45) Date of Patent: Sep. 2, 2025

(54) FOAM AND METHOD FOR MANUFACTURING FOAM

(71) Applicant: SEKISUI CHEMICAL CO., LTD., Osaka (JP)

(72) Inventors: Yasuhiro Kawaguchi, Yamaguchi (JP); Yusaku Uchiyama, Yamaguchi (JP); Takehisa Sugaya, Yamaguchi (JP); Katsuhiro Nakazato, Yamaguchi (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 726 days.

(21) Appl. No.: 17/634,060

(22) PCT Filed: Sep. 7, 2020

(86) PCT No.: PCT/JP2020/033800
§ 371 (c)(1),
(2) Date: Feb. 9, 2022

(87) PCT Pub. No.: WO2021/059945
PCT Pub. Date: Apr. 1, 2021

(65) Prior Publication Data
US 2022/0325062 A1    Oct. 13, 2022

(30) Foreign Application Priority Data
Sep. 27, 2019  (JP) .............................. 2019-177564

(51) Int. Cl.
C08J 9/32       (2006.01)
B29C 48/00      (2019.01)
B29K 101/12     (2006.01)

(52) U.S. Cl.
CPC ............. *C08J 9/32* (2013.01); *B29C 48/0012* (2019.02); *B29C 48/022* (2019.02); *B29K 2101/12* (2013.01); *C08J 2205/052* (2013.01); *C08J 2205/10* (2013.01); *C08J 2300/22* (2013.01); *C08J 2300/26* (2013.01)

(58) Field of Classification Search
CPC ... B29C 44/50; B29C 48/0012; B29C 48/022; B29K 2101/12; C08J 9/32; C08J 2201/03; C08J 2203/22; C08J 2205/044; C08J 2205/052; C08J 2205/10; C08J 2300/22; C08J 2300/26; C08J 2323/12; C08J 2353/02; C08J 2423/16
See application file for complete search history.

(56) References Cited

U.S. PATENT DOCUMENTS

| | | | |
|---|---|---|---|
| 6,451,866 B1 | 9/2002 | Kanai et al. | |
| 2009/0148698 A1 | 6/2009 | Kawaguchi et al. | |
| 2012/0211912 A1* | 8/2012 | Kawaguchi | B29C 44/586 264/51 |
| 2013/0184362 A1 | 7/2013 | Yamauchi et al. | |
| 2020/0231763 A1 | 7/2020 | Uchiyama | |

FOREIGN PATENT DOCUMENTS

| | | |
|---|---|---|
| CN | 101346218 | 1/2009 |
| CN | 103080199 | 5/2013 |
| EP | 3 480 242 | 5/2019 |
| JP | 5-293903 | 11/1993 |
| JP | 11-343362 | 12/1999 |
| JP | 2001-301006 | 10/2001 |
| JP | 3405821 | 3/2003 |
| JP | 2009-69752 | 4/2009 |
| TW | 201905053 | 2/2019 |
| TW | 201920386 | 6/2019 |
| WO | 2015/103096 | 7/2015 |
| WO | 2019/006029 | 1/2019 |
| WO | 2019/073825 | 4/2019 |

OTHER PUBLICATIONS

International Search Report issued Nov. 2, 2020 in corresponding International (PCT) Patent Application No. PCT/JP2020/033800.

* cited by examiner

*Primary Examiner* — John M Cooney
(74) *Attorney, Agent, or Firm* — Wenderoth, Lind & Ponack, L.L.P.

(57) ABSTRACT

The present invention aims to provide a foam that is less likely to deflate even after prolonged or repeated load application, has low density, and has good appearance quality, and a method for producing the foam. Provided is a foam including cells dispersed in an elastomer resin, the cells having an average diameter of 40 to 60 μm and an average circularity of 0.990 or greater.

6 Claims, No Drawings

FOAM AND METHOD FOR MANUFACTURING FOAM

TECHNICAL FIELD

The present invention relates to a foam and a method for producing the foam.

BACKGROUND ART

Molded bodies excellent in performance such as cushioning and vibration damping have been used in medical components and components used in automobiles, railroads, train tracks, bridges, buildings, and the like. Such molded bodies can be obtained by molding base resins such as rubbers or thermoplastic elastomers into the shape of a plate or the like. To enhance performance such as cushioning and vibration damping, foam molding of base resins has been studied.

For example, a base resin may be foam-molded by a method of adding a volatile foaming agent that decomposes with heat and generates gas to the base resin to perform foam molding, or a method of increasing the solubility of a gas such as carbonic acid gas to dissolve the gas in the base resin and then decreasing the solubility of the gas to generate gas. For example, Patent Literature 1 discloses a method of producing a highly foamed sheet by impregnating an olefin resin sheet with a volatile foaming agent, followed by foaming with steam at an expansion rate of 0.2 to 1.0 times/sec.

Another method that has been proposed to foam-mold a base resin is to add thermally expandable microcapsules to the base resin to perform foam molding, each microcapsule containing a polymer-containing shell and a volatile liquid as a core agent encapsulated by the shell. For example, Patent Literature 2 discloses a silicone rubber sponge composition and a silicone rubber sponge, wherein the silicone rubber sponge composition contains a thermosetting millable silicone rubber composition and 0.1 to 20 parts by weight of thermally expandable microcapsules that expand at a temperature of 80° C. to 200° C.

CITATION LIST

Patent Literature

Patent Literature 1: JP H05-293903 A
Patent Literature 2: JP 3405821 B

SUMMARY OF INVENTION

Technical Problem

However, the foams disclosed in Patent Literatures 1 and 2 do not have sufficient fatigue resistance against prolonged or repeated compression. They are also not sufficiently lightweight as a foam, and have poor appearance quality at the foam surface.

The present invention aims to provide a foam that is less likely to deflate even after prolonged or repeated load application, has low density, and has good appearance quality. The present invention also aims to provide a method for producing the foam.

Solution to Problem

The present invention relates to a foam including cells dispersed in an elastomer resin, the cells having an average diameter of 40 to 60 μm and an average circularity of 0.990 or greater.

The present invention is described in detail below.

The foam of the present invention includes cells dispersed in an elastomer resin. The cells as used herein mean voids dispersed in the elastomer resin. The cells are preferably closed cells.

The elastomer resin may be any elastomer resin typically used in foam molding. The elastomer resin is preferably a thermoplastic elastomer or a rubber.

The thermoplastic elastomer as used herein means a substance that shows the characteristics of an elastomer, that is, of a vulcanized rubber, at room temperature and shows thermoplasticity at high temperature.

The thermoplastic elastomer is not limited. Examples thereof include styrenic thermoplastic elastomers (abbreviated as "SBCs"; in the following, the terms in parentheses are abbreviations), thermoplastic olefinic elastomers (TPOs, TPVs), thermoplastic urethane elastomers (TPUs), thermoplastic ester elastomers (TPEEs), and thermoplastic amide elastomers (TPAEs).

Preferred among these are thermoplastic olefinic elastomers (TPOs).

A thermoplastic olefinic elastomer (TPO) contains an olefin resin such as polypropylene (PP) or polyethylene (PE) as a hard segment and an ethylene/α-olefin copolymer rubber such as EPDM or EPR as a soft segment. Thermoplastic olefinic elastomers can be classified into a crosslinked type and a non-crosslinked type.

Crosslinked type TPOs have chemically crosslinked rubber portions, and have higher rubber elasticity and heat resistance than non-crosslinked type TPOs. While typical vulcanized rubbers are crosslinked under static conditions, crosslinked type TPOs are produced by what is called dynamic crosslinking technique, in which crosslinking reaction is performed under kneading conditions, for example in an extruder. The most common TPO is a PP-EPDM olefinic thermoplastic vulcanizate (TPV). In recent years, TPVs have increasingly replaced vulcanized rubber or flexible polyvinyl chloride, as especially the automobile industry has started to address global environmental issues in earnest.

Examples of the non-crosslinked type TPOs include copolymers of α-olefins such as ethylene, propylene, 1-butene, 1-pentene, 1-hexene, and 1-octene. Elastomer matrix crystalline pseudo-crosslink type TPO, in which a polyolefin resin forms a network structure in an EP rubber matrix, may be also suitably used.

Examples of the styrenic thermoplastic elastomers include styrene-isobutylene block copolymers (SIB), styrene-isobutylene-styrene block copolymers (SIBS), styrene-isoprene-styrene block copolymers (SIS), styrene-butadiene-styrene block copolymers (SBS), styrene-butadiene/butylene-styrene block copolymers (SBBS), styrene-ethylene/propylene-styrene block copolymers (SEPS), styrene-ethylene/butene-styrene block copolymers (SEBS), and styrene-ethylene/ethylene/propylene-styrene block copolymers (SEEPS).

Other examples include thermoplastic polyvinyl chloride elastomers (TPVCs), ion cluster type thermoplastic elastomers (ionomers), and fluorine thermoplastic elastomers containing a fluororesin as a constraining block.

These thermoplastic elastomers may be used alone or in combination of two or more thereof.

Commercially available olefinic thermoplastic vulcanizates (TPVs) include Milastomer (produced by Mitsui Chemicals, Inc.).

The Milastomer has an sea-island structure composed of a sea phase of PP and an island phase of crosslinked EPDM, with the island phase having an average distribution particle size of about several micrometers. There are chemical bonds at the interfaces between the sea phase and the island phase, enhancing the interfaces and thus improving mechanical properties and rubber elasticity.

The rubber as used herein means a polymer substance that shows elasticity at room temperature. The rubber is not limited, and may be natural rubber (NR) or synthetic rubber. Examples of the synthetic rubber include isoprene rubber (IR), styrene butadiene rubber (SBR), butadiene rubber (BR), chloroprene acrylorubber (CR), nitrile butadiene rubber (NBR), butyl rubber (IIR), ethylene propylene rubber (EPDM), urethane rubber (U), silicone rubber (Q), fluororubber (FKM), chlorosulfonated polyethylene rubber (CSM), chlorinated polyethylene (CM), acrylic rubber (ACM, ANM), epichlorohydrin rubber (CO, ECO), and polysulfide rubber (T). Preferred among these are isoprene rubber (IR), styrene-butadiene rubber (SBR), butadiene rubber (BR), chloroprene acrylorubber (CR), butyl rubber (IIR), and ethylene propylene rubber (EPDM).

Common thermoplastic resins may also be used as other resin components.

Examples of the thermoplastic resins include common thermoplastic resins such as polyvinyl chloride, polypropylene, polypropylene oxide, and polystyrene and engineering plastics such as polybutylene terephthalate, nylon, polycarbonate, and polyethylene terephthalate. In particular, at least one selected from the group consisting of low density polyethylene, high-density polyethylene, polypropylene, and polystyrene is preferred.

The lower limit of the average diameter of the cells is 40 μm, and the upper limit thereof is 60 μm. The cells having an average diameter within the above range can improve the surface appearance of the foam.

The lower limit of the average diameter of the cells is preferably 41 μm, and the upper limit thereof is preferably 58 μm. The lower limit is more preferably 43 μm, and the upper limit is more preferably 57 μm. The upper limit is still more preferably 50 μm, particularly preferably 48 μm, further particularly preferably 47 μm.

The average diameter means the value obtained as follows. The foam is cut using a sharp-edged tool (e.g., a razor), a microtome, or focused ion beam, for example. The obtained cross section is sputtered with platinum, gold, or the like, and then observed with an electron microscope. The diameters of a hundred randomly selected cells (n=100) are measured, and the average is calculated. Here, for a cell having a non-circular cross-sectional shape, the diameter of the cell means the average of the major axis and the minor axis of the cell.

The upper limit of the CV value of the diameter of the cells is preferably 40%. The lower limit of the CV value is not limited, and is preferably 10%.

The lower limit of the average circularity of the cells of the foam of the present invention is 0.990. The cells having an average circularity of 0.990 or greater can improve the surface appearance and the compression set of the foam.

The lower limit of the average circularity of the cells is preferably 0.992, more preferably 0.995. The preferable upper limit thereof is not limited, and is for example 1.00 (true circle). In the present invention, simply "the average circularity of the cells" means the average circularity for the entire foam.

The average circularity of the cells in the entire foam is determined by calculating "the average circularity of the cells in a surface layer" and "the average circularity of the cells in a center portion" described later and then calculating the average circularity of the cells in the entire foam from the cross-sectional area ratio between the "surface layer" and the "center portion".

In the foam of the present invention, the cells in a surface layer, i.e., a portion from the surface to a depth of 100 μm, preferably have an average circularity of 0.980 or greater. When the cells in the surface layer have an average circularity of 0.980 or greater, the surface appearance and the compression set of the foam can be further improved.

The lower limit of the average circularity of the cells in the surface layer is more preferably 0.985. The preferable upper limit thereof is not limited, and is for example 1.00 (true circle).

The average circularity means the value obtained as follows. The foam is cut to provide a cross section in the same manner as in the measurement of the average diameter. A micrograph of the cross section is subjected to image analysis to measure the circularities of multiple cells, and the resulting circularities are averaged. The circularity herein is defined as $4\pi A/B^2$ when the cell projected area (A) and the cell perimeter (B) are measured using an electron microscope. A cell with a shape closer to a true circle has a greater circularity value. A cell with a true circle shape has a circularity of 1.00. In contrast, a cell with a shape more deviating from a true circle has a smaller circularity value.

A depth of 100 μm from the surface means 100 μm in the tangential direction from the surface of the foam.

In the foam of the present invention, the cells in a center portion, i.e., a portion other than the surface layer, preferably have an average circularity of 0.990 or greater. When the cells in the center portion have an average circularity of 0.990 or greater, the compression set can be further improved.

The lower limit of the average circularity of the cells in the center portion is more preferably 0.985. The preferable upper limit thereof is not limited, and is for example 1.00 (true circle).

In the foam of the present invention, the cells in the surface layer, i.e., the portion from the surface to a depth of 100 μm, preferably have an average minor-to-major axis ratio of 0.81 or greater. Specifying such an average minor-to-major axis ratio of the cells in the surface layer can improve the surface appearance and the compression set of the foam. The lower limit of the average minor-to-major axis ratio of the cells in the surface layer is more preferably 0.82. When the average minor-to-major axis ratio of the cells in the surface layer is 0.82 or greater, the surface appearance and the compression set of the foam can be further improved. The preferable upper limit thereof is not limited, and is for example 1.00 (true circle).

The average minor-to-major axis ratio means the value obtained as follows. The foam is cut to provide a cross section in the same manner as in the measurement of the average diameter. A micrograph of the cross section is subjected to image analysis to measure the minor-to-major axis ratios of multiple cells, and the resulting minor-to-major axis ratios are averaged. The minor-to-major axis ratio herein is defined as D/C when the maximum diameter [major axis (C)] and the minimum diameter [minor axis (D)] of the projected image of the cell are measured using an electron microscope.

In the foam of the present invention, the cells in the center portion, i.e., the portion other than the surface layer, preferably have an average minor-to-major axis ratio of 0.87 or greater. Specifying such an average minor-to-major axis ratio of the cells in the center portion can improve the surface appearance and the compression set of the foam.

The lower limit of the average minor-to-major axis ratio of the cells in the center portion is preferably 0.89. When the average minor-to-major axis ratio of the cells in the center portion is 0.89 or greater, the surface appearance and the compression set of the foam can be further improved. The preferable upper limit thereof is not limited, and is for example 1.00.

The lower limit of the average minor-to-major axis ratio of the cells in the entire foam of the present invention is preferably 0.87. When the cells in the entire foam have an average minor-to-major axis ratio of 0.87 or greater, the surface appearance and the compression set of the foam can be improved.

The lower limit of the average minor-to-major axis ratio of the cells in the entire foam is more preferably 0.88. The preferable upper limit thereof is not limited, and is for example 1.00.

The lower limit of the average projected area of the cells in the entire foam of the present invention is preferably 1,250 $\mu m^2$, and the upper limit thereof is preferably 2,850 $\mu m^2$. The cells having an average projected area within the above range can improve the surface appearance of the foam. The lower limit of the average projected area of the cells is more preferably 1,315 $\mu m^2$, still more preferably 1,450 $\mu m^2$. The upper limit thereof is more preferably 2,660 $\mu m^2$, and the lower limit thereof is still more preferably 2,570 $\mu m^2$.

The average projected area of the cells means the average of the projected areas (A) of the multiple cells obtained in the measurement of the average circularity.

The lower limit of the average perimeter of the cells in the entire foam of the present invention is preferably 125 $\mu m$, and the upper limit thereof is preferably 195 $\mu m$. The cells having an average perimeter within the above range can improve the surface appearance and the compression set of the foam. The lower limit of the average perimeter of the cells is more preferably 128 $\mu m$, still more preferably 135 $\mu m$. The upper limit thereof is more preferably 188 $\mu m$, and the lower limit thereof is still more preferably 185 $\mu m$.

The average perimeter of the cells means the average of the perimeters (B) of the multiple cells obtained in the measurement of the average circularity.

The foam of the present invention has a thickness of 300 $\mu m$ or greater. The foam having a thickness of 300 $\mu m$ or greater can have improved flexural strength (rigidity), and also can improve the measurement accuracy of the cell shape. The lower limit of the thickness is preferably 500 $\mu m$, and the upper limit thereof is preferably 5,000 $\mu m$. The thickness herein is defined as a length from one surface of the foam to the other surface in the tangential direction.

The thickness can be measured using a measurement tool such as a caliper, a dial indicator, or a micrometer. The foam of the present invention may have any shape. Examples of the shape include a plate shape, a cuboid (block) shape, a prism shape, a cylinder shape, a pyramid shape, a circular cone shape, a truncated cone shape, a truncated pyramid shape, and a box shape (recess shape). Preferred among these are a plate shape and a cuboid shape.

Preferably, the cells are formed by thermal expansion of thermally expandable microcapsules, the thermally expandable microcapsules each containing: a shell containing a polymer; and a volatile liquid as a core agent encapsulated by the shell.

The thermally expandable microcapsules expand with heat as the shell plasticizes while the core agent vaporizes to increase vapor pressure. Thus, foam molding by adding the thermally expandable microcapsules to the elastomer resin provides a foam containing dispersed cells that are formed by thermal expansion of the thermally expandable microcapsules. These cells are formed by the shells of the thermally expandable microcapsules.

The shells constituting the thermally expandable microcapsules preferably contain a polymer obtained by polymerizing a monomer mixture that contains a polymerizable monomer (I) containing at least one selected from acrylonitrile, methacrylonitrile, and vinylidene chloride.

Adding the polymerizable monomer (I) can improve the gas barrier properties of the shells.

In order to further improve the heat resistance, the shells constituting the thermally expandable microcapsules preferably contain a polymer obtained by polymerizing a monomer mixture that contains 40 to 90% by weight of the polymerizable monomer (I) and 5 to 50% by weight of a radically polymerizable unsaturated carboxylic acid monomer (II) having a carboxy group and having a carbon number of 3 to 8.

The lower limit of the amount of the polymerizable monomer (I) in the monomer mixture is preferably 40% by weight, and the upper limit thereof is preferably 90% by weight. When the amount of the polymerizable monomer (I) in the monomer mixture is less than 40% by weight, the shells have low gas barrier properties, which may decrease the expansion ratio. When the amount of the polymerizable monomer (I) in the monomer mixture is more than 90% by weight, the heat resistance may not increase. The lower limit of the amount of the polymerizable monomer (I) in the monomer mixture is more preferably 50% by weight, and the upper limit thereof is more preferably 80% by weight.

The radically polymerizable unsaturated carboxylic acid monomer (II) having a carboxy group and having a carbon number of 3 to 8 may be a monomer having one or more free carboxyl groups per molecule for ionic crosslinking. Specific examples thereof include: unsaturated monocarboxylic acids, unsaturated dicarboxylic acids, and anhydrides thereof; and monoesters of unsaturated dicarboxylic acids and derivatives thereof.

Examples of the unsaturated monocarboxylic acids include acrylic acid, methacrylic acid, ethacrylic acid, crotonic acid, and cinnamic acid. Examples of the unsaturated dicarboxylic acids include maleic acid, itaconic acid, fumaric acid, citraconic acid, and chloromaleic acid. Examples of the monoesters of unsaturated dicarboxylic acids include monomethyl maleate, monoethyl maleate, monobutyl maleate, monomethyl fumarate, monoethyl fumarate, monomethyl itaconate, monoethyl itaconate, and monobutyl itaconate. These may be used alone or in combination of two or more thereof. Particularly preferred among these are acrylic acid, methacrylic acid, maleic acid, maleic anhydride, and itaconic acid.

In the monomer mixture, the lower limit of the amount of a segment derived from the radically polymerizable unsaturated carboxylic acid monomer (II) having a carboxy group and having a carbon number of 3 to 8 is preferably 5% by weight, and the upper limit thereof is preferably 50% by weight. When the amount of the segment derived from the radically polymerizable unsaturated carboxylic acid monomer (II) is less than 5% by weight, the maximum foaming temperature may be 190° C. or lower. When the amount of the segment derived from the radically polymerizable unsaturated carboxylic acid monomer (II) is more than 50% by weight, the maximum foaming temperature is improved, but the expansion ratio is decreased. The lower limit of the amount of the segment derived from the radically polymerizable unsaturated carboxylic acid monomer (II) in the monomer mixture is more preferably 10% by weight, and the upper limit thereof is more preferably 40% by weight.

The monomer mixture is not limited as long as the amounts of the polymerizable monomer (I) and the segment derived from the radically polymerizable unsaturated carboxylic acid monomer (II) having a carboxy group and having a carbon number of 3 to 8 are within the above ranges. Preferably, any of the following monomer mixtures (1) to (3) is used.

The monomer mixture (1) contains 40 to 90% by weight of the polymerizable monomer (I) and 5 to 50% by weight of the radically polymerizable unsaturated carboxylic acid monomer (II) having a carboxy group and having a carbon number of 3 to 8, and is preferably free of a polymerizable monomer (III) having two or more double bonds in a molecule.

The monomer mixture (1) is preferably free of a polymerizable monomer (III) having two or more double bonds in a molecule. The polymerizable monomer (III) is a monomer usually used as a cross-linking agent.

The monomer mixture (1) contains predetermined amounts of the polymerizable monomer (I) and the radically polymerizable unsaturated carboxylic acid monomer (II). With the use of the monomer mixture, shells having sufficient strength can be obtained. Thus, even when the monomer mixture is free of a polymerizable monomer (III) having two or more double bonds in a molecule, the resulting thermally expandable microcapsules can have excellent shear resistance, heat resistance, and foamability. The reason for the sufficient strength is not clear, but presumably crosslinking by the dehydration condensation between carboxyl groups is involved.

Adding the polymerizable monomer (III) causes the thermally expandable microcapsules to have a distorted particle shape, resulting in a decreased bulk specific gravity.

As described above, the monomer mixture (1) enables production of thermally expandable microcapsules having sufficient strength and heat resistance without the use of a polymerizable monomer (III) having two or more double bonds in a molecule. The expression "the monomer mixture is free of a polymerizable monomer (III) having two or more double bonds in a molecule" herein means that the monomer mixture is substantially free of the polymerizable monomer (III). When the monomer mixture contains the polymerizable monomer (III) in a trace amount, the monomer mixture is regarded as being free of the polymerizable monomer (III).

Examples of the polymerizable monomer (III) include monomers having two or more radically polymerizable double bonds. Specific examples thereof include divinylbenzene, ethylene glycol di(meth)acrylate, diethylene glycol di(meth)acrylate, triethylene glycol di(meth)acrylate, propylene glycol di(meth)acrylate, and 1,4-butanediol di(meth)acrylate. Examples also include 1,6-hexanediol di(meth)acrylate, 1,9-nonanediol di(meth)acrylate, di(meth)acrylate of polyethylene glycol having a molecular weight of 200 to 600, glycerol di(meth)acrylate, and trimethylolpropane di(meth)acrylate.

Examples also include trimethylolpropane tri(meth)acrylate, ethylene oxide-modified trimethylolpropane tri(meth)acrylate, pentaerythritol tri(meth)acrylate, and triallylformal tri(meth)acrylate.

Examples also include pentaerythritol tetra(meth)acrylate, dipentaerythritol hexa(meth)acrylate, and dimethyloltricyclodecane di(meth)acrylate.

The monomer mixture (2) contains 40 to 90% by weight of the polymerizable monomer (I), 5 to 50% by weight of the radically polymerizable unsaturated carboxylic acid monomer (II) having a carboxy group and having a carbon number of 3 to 8, 0.2% by weight or less of the polymerizable monomer (III), and 0.1 to 10% by weight of a metal cation hydroxide (IV).

The monomer mixture (2) preferably contains the polymerizable monomer (III) having two or more double bonds in a molecule. The polymerizable monomer (III) functions as a cross-linking agent.

When the polymerizable monomer (III) is contained, the strength of the shells can be enhanced, making the cell walls less prone to breaking upon thermal expansion.

The polymerizable monomer (III) is not limited as long as it is different from the radically polymerizable unsaturated carboxylic acid monomer (II) having a carboxy group and having a carbon number of 3 to 8. Typically, a monomer having two or more radically polymerizable double bonds is suitably used. Specific examples thereof include divinylbenzene, ethylene glycol di(meth)acrylate, diethylene glycol di(meth)acrylate, triethylene glycol di(meth)acrylate, propylene glycol di(meth)acrylate, 1,4-butanediol di(meth)acrylate, and 1,6-hexanediol di(meth)acrylate.

Examples also include 1,9-nonanediol di(meth)acrylate, di(meth)acrylate of polyethylene glycol having a molecular weight of 200 to 600, glycerol di(meth)acrylate, and trimethylolpropane di(meth)acrylate.

Examples also include trimethylolpropane tri(meth)acrylate, ethylene oxide-modified trimethylolpropane tri(meth)acrylate, pentaerythritol tri(meth)acrylate, pentaerythritol tetra(meth)acrylate, and dipentaerythritol hexa(meth)acrylate.

The upper limit of the amount of the polymerizable monomer (III) in the monomer mixture (2) is preferably 0.2% by weight. Adding the polymerizable monomer (III) in an amount more than 0.2% by weight causes the thermally expandable microcapsules to have a distorted particle shape, resulting in a decreased bulk specific gravity. A decreased bulk specific gravity makes the thermally expandable microcapsules more susceptible to shear especially when extrusion molding is performed in the subsequent step, and thus makes the thermally expandable microcapsules more likely to foam. In the present invention, the amount of the polymerizable monomer (III) is 0.2% by weight or less, so that the decrease in the bulk specific gravity can be prevented. The lower limit of the amount of the polymerizable monomer (III) is preferably 0% by weight. The upper limit thereof is more preferably 0.1% by weight.

The monomer mixture (2) preferably contains a metal cation hydroxide (IV).

When the monomer mixture (2) contains the metal cation hydroxide (IV), ionic bonding is formed between the metal cation hydroxide (IV) and the carboxy group of the radically polymerizable unsaturated carboxylic acid monomer (II), increasing the rigidity and the heat resistance. This makes it possible to provide thermally expandable microcapsules that neither break nor shrink in a high temperature range for a long time. In addition, the thermally expandable microcapsules neither break nor shrink in molding processing involving strong shear force such as knead molding, calender molding, extrusion molding, or injection molding because the elastic modulus of the shells is less likely to decrease even in a high temperature range.

Moreover, the formation of ionic bonding, not covalent bonding, allows the thermally expandable microcapsules to have a particle shape close to a true sphere and thus to be less prone to distortion. This is presumably because crosslinks by ionic bonding exhibit lower bonding strength than crosslinks by covalent bonding, and thus the volume of the thermally expandable microcapsules uniformly shrinks when the monomers are converted to a polymer during polymerization.

The metal cation of the metal cation hydroxide (IV) may be any metal cation that reacts with the radically polymerizable unsaturated carboxylic acid monomer (II) to form ionic bonding. Examples thereof include ions of Na, K, Li, Zn, Mg, Ca, Ba, Sr, Mn, Al, Ti, Ru, Fe, Ni, Cu, Cs, Sn, Cr, and Pb. Since the purpose is to form ionic bonding with the radically polymerizable unsaturated carboxylic acid monomer (II), a hydroxide of the metal cation is needed. Chlorides such as NaCl, which form weak ionic bonding, do not fall within the category. In particular, the ions of Ca, Zn, and Al, which are divalent or trivalent metal cations, are preferred, and the ion of Zn is particularly preferred. These metal cation hydroxides (IV) may be used alone or in combination of two or more thereof.

In the monomer mixture (2), the lower limit of the amount of the metal cation hydroxide (IV) is preferably 0.1% by weight, and the upper limit thereof is preferably 10% by weight. When the amount of the metal cation hydroxide (IV) is less than 0.1% by weight, the metal cation hydroxide (IV) may have no effect on the heat resistance. When the amount of the metal cation hydroxide (IV) is more than 10% by weight, the expansion ratio may be significantly low. The lower limit of the metal cation hydroxide (IV) is more preferably 0.5% by weight, and the upper limit thereof is more preferably 5% by weight.

The monomer mixture (3) contains 40 to 90% by weight of the polymerizable monomer (I), 5 to 50% by weight of the radically polymerizable unsaturated carboxylic acid monomer (II) having a carboxy group and having a carbon number of 3 to 8, and 0.1 to 10% by weight of the metal cation hydroxide (IV). The monomer mixture (3) is also preferably free of the polymerizable monomer (III) having two or more double bonds in a molecule.

In a suitable embodiment of the present invention, the monomer mixture (3) is free of the polymerizable monomer (III) having two or more double bonds in a molecule.

Crosslinking by ionic bonding between the radically polymerizable unsaturated carboxylic acid monomer (II) and the metal cation hydroxide (IV) allows the resulting shells to have sufficient strength and heat resistance even when the monomer mixture is free of the polymerizable monomer (III) having two or more double bonds in a molecule. Adding the polymerizable monomer (III) causes the thermally expandable microcapsules to have a distorted particle shape, which may result in a decreased bulk specific gravity. A decreased bulk specific gravity makes the thermally expandable microcapsules more susceptible to shear especially when extrusion molding is performed in the subsequent step, and thus makes thermally expandable microcapsules more likely to foam.

The monomer mixture (3) mainly causes the crosslinking by ionic bonding and decreases the crosslinking by covalent bonding, and thereby enables production of thermally expandable microcapsules having sufficient strength and heat resistance without the use of the polymerizable monomer (III) having two or more double bonds in a molecule. The expression "the monomer mixture is free of a polymerizable monomer (III) having two or more double bonds in a molecule" herein means that the monomer mixture (III) is substantially free of the polymerizable monomer (III). When the monomer mixture contains the polymerizable monomer (III) in a trace amount, the monomer mixture is regarded as being free of the polymerizable monomer (III).

The monomer mixture may contain other monomers in addition to the polymerizable monomer (I), radically polymerizable unsaturated carboxylic acid monomer (II), and the like. Examples of such other monomers include acrylates such as methyl acrylate, ethyl acrylate, butyl acrylate, and dicyclopentenyl acrylate; methacrylates such as methyl methacrylate, ethyl methacrylate, butyl methacrylate, and isobornyl methacrylate; and vinyl monomers such as vinyl acetate and styrene. These other monomers may be appropriately selected according to the characteristics required for the thermally expandable microcapsules. Preferred among these are methyl methacrylate, ethyl methacrylate, and methyl acrylate. The amount of such other monomers in all the monomers constituting the shells is preferably less than 10% by weight. When the amount of such other monomers is 10% by weight or more, the gas barrier properties of the cell walls are reduced, and the thermal expandability tends to be disadvantageously deteriorated.

The monomer mixture contains a polymerization initiator to polymerize the monomers.

Suitable polymerization initiators include dialkyl peroxides, diacyl peroxides, peroxy esters, peroxydicarbonates, and azo compounds.

Examples of the dialkyl peroxides include methyl ethyl peroxide, di-t-butyl peroxide, isobutyl peroxide, and dicumyl peroxide.

Examples of the diacyl peroxides include benzoyl peroxide, 2,4-dichlorobenzoyl peroxide, and 3,5,5-trimethylhexanoyl peroxide.

Examples of the peroxy esters include t-butyl peroxypivalate, t-hexyl peroxypivalate, t-butyl peroxyneodecanoate, t-hexyl peroxyneodecanoate, 1-cyclohexyl-1-methylethyl peroxyneodecanoate, and 1,1,3,3-tetramethylbutyl peroxyneodecanoate.

Examples of the peroxydicarbonates include bis(4-t-butylcyclohexyl) peroxydicarbonate, di-n-propyl-oxydicarbonate, diisopropyl peroxydicarbonate, di(2-ethylethylperoxy)dicarbonate, and dimethoxybutyl peroxydicarbonate.

Examples of the azo compounds include 2,2'-azobisisobutyronitrile, 2,2'-azobis(4-methoxy-2,4-dimethylvaleronitrile), 2,2'-azobis(2,4-dimethylvaleronitrile), and 1,1'-azobis (1-cyclohexanecarbonitrile).

The lower limit of the weight average molecular weight of the polymer constituting the shells is preferably 100,000, and the upper limit thereof is preferably 2,000,000. A polymer having a weight average molecular weight of 100,000 or greater can increase the shell strength. A polymer having a weight average molecular weight of 2,000,000 or smaller can reduce or prevent an excessive increase in shell strength, thus reducing a decrease in expansion ratio.

The shells may further contain a stabilizer, an ultraviolet absorber, an antioxidant, an antistatic agent, a flame retardant, a silane coupling agent, a colorant, and the like, if necessary.

The thermally expandable microcapsules each include a volatile expansion agent as a core agent encapsulated by the shell.

The volatile expansion agent is a substance that becomes gaseous at a temperature lower than or equal to the softening point of the polymer constituting the shell. The volatile expansion agent is preferably a low-boiling-point organic solvent.

Examples of the volatile expansion agent include low molecular weight hydrocarbons, chlorofluorocarbons, and tetraalkylsilanes.

Examples of the low molecular weight hydrocarbons include ethane, ethylene, propane, propene, n-butane, isobutane, butene, isobutene, n-pentane, isopentane, neopentane, n-hexane, heptane, isooctane, and petroleum ether.

Examples of the chlorofluorocarbons include $CCl_3F$, $CCl_2F_2$, $CClF_3$, and $CClF_2$—$CClF_2$.

Examples of the tetraalkylsilanes include tetramethylsilane, trimethylethylsilane, trimethylisopropylsilane, and trimethyl-n-propylsilane.

In particular, isobutane, n-butane, n-pentane, isopentane, n-hexane, isooctane, petroleum ether, and mixtures of these are preferred. These volatile expansion agents may be used alone or in combination of two or more thereof.

The volatile expansion agent may be a pyrolytic compound that is pyrolyzed into a gaseous form by heat.

Among the above volatile expansion agents, a low-boiling-point hydrocarbon having a carbon number of 5 or less is preferably used for the thermally expandable microcapsules. Such a hydrocarbon allows the resulting thermally expandable microcapsules to have a high expansion ratio and to quickly start foaming.

The volatile expansion agent may be a pyrolytic compound that is pyrolyzed into a gaseous form by heat.

The lower limit of the amount of the volatile expansion agent used as the core agent is preferably 10% by weight, and the upper limit thereof is preferably 25% by weight.

The core agent in an amount of 10% by weight or more can prevent the shell thickness from being too large, thus reducing a decrease in expansion ratio. The core agent in an amount of 25% by weight or less can reduce a decrease in shell strength. In addition, the core agent in an amount of 10 to 25% by weight makes it possible to achieve both prevention of the deflation of the thermally expandable microcapsules and improvement of the foaming performance.

The lower limit of the maximum foaming temperature (Tmax) of the thermally expandable microcapsules is preferably 180° C., and the upper limit thereof is preferably 230° C. The thermally expandable microcapsules having a maximum foaming temperature of 180° C. or higher can have high heat resistance and are less likely to rupture or shrink in a high temperature range or during molding. For a further reduction in the rupture or shrinking of the thermally expandable microcapsules, the lower limit of the maximum foaming temperature is more preferably 190° C.

The maximum foaming temperature herein means the temperature at which thermally expandable microcapsules reach their maximum diameter (maximum displacement) when the diameters of the thermally expandable microcapsules are measured while the thermally expandable microcapsules are heated from room temperature.

The lower limit of the maximum displacement (Dmax) of the thermally expandable microcapsules as measured by thermomechanical analysis is preferably 300 µm, and the upper limit thereof is preferably 1,200 µm.

The maximum displacement means the value of displacement at which a predetermined amount of thermally expandable microcapsules as a whole reach their maximum diameter when the diameters of the predetermined amount of thermally expandable microcapsules are measured while the microcapsules are heated from room temperature.

The lower limit of the foaming starting temperature (Ts) is preferably 160° C., and the upper limit thereof is preferably 200° C.

The maximum foaming temperature herein means the temperature at which thermally expandable microcapsules reach the maximum displacement when the diameters of the thermally expandable microcapsules are measured while the thermally expandable microcapsules are heated from room temperature.

The lower limit of the average particle size of the thermally expandable microcapsules is preferably 15 µm, and the upper limit thereof is preferably 25 µm. Thermally expandable microcapsules having an average particle size of 15 µm or greater can provide a sufficiently foamed molded body. Thermally expandable microcapsules having an average particle size of 25 µm or smaller can provide a molded body having sufficient strength. The lower limit of the average particle size is more preferably 18 µm, still more preferably 19 µm, and the upper limit thereof is more preferably 23 µm.

The average particle size of the thermally expandable microcapsules means a volume average particle size measured using, for example, a particle size distribution size measurement device.

The present invention also provides a method for producing the thermally expandable microcapsules. An exemplary method for producing the thermally expandable microcapsules includes the steps of: preparing an aqueous medium; and dispersing an oily mixture in the aqueous medium, the oily mixture containing 40 to 90% by weight of the polymerizable monomer (I), 5 to 50% by weight of the radically polymerizable unsaturated carboxylic acid monomer (II) having a carboxy group and having a carbon number of 3 to 8, and a volatile expansion agent; and polymerizing the monomers.

In production of the thermally expandable microcapsules, first, the step of preparing an aqueous medium is performed. Specifically, for example, a polymerization reaction container is charged with water, a dispersion stabilizer, and if necessary an auxiliary stabilizer, to prepare an aqueous dispersion medium containing the dispersion stabilizer. If necessary, alkali metal nitrite, stannous chloride, stannic chloride, potassium dichromate, or the like may be added.

Examples of the dispersion stabilizer include silica, calcium phosphate, magnesium hydroxide, aluminum hydroxide, ferric hydroxide, barium sulfate, calcium sulfate, sodium sulfate, calcium oxalate, calcium carbonate, calcium carbonate, barium carbonate, and magnesium carbonate. The silica is preferably colloidal silica.

The amount of the dispersion stabilizer added is not limited, and appropriately decided according to the type of the dispersion stabilizer, the particle size of the thermally expandable microcapsules, and the like. The lower limit of the amount of the dispersion stabilizer added relative to 100 parts by weight of the monomers is preferably 0.1 parts by weight, and the upper limit thereof is preferably 20 parts by weight.

Examples of the auxiliary stabilizer include condensation products of diethanolamine and aliphatic dicarboxylic acids and condensation products of urea and formaldehyde. Examples also include polyvinylpyrrolidone, polyethylene oxide, polyethyleneimine, tetramethylammonium hydroxide, gelatin, methylcellulose, polyvinyl alcohol, dioctyl sulfosuccinate, sorbitan esters, and emulsifiers.

Examples of the combination of the dispersion stabilizer and the auxiliary stabilizer include, but not limited to, a combination of colloidal silica and a condensation product, a combination of colloidal silica and a water-soluble nitrogen-containing compound, and a combination of magnesium hydroxide or calcium phosphate and an emulsifier. Preferred among these is a combination of colloidal silica and a condensation product.

The condensation product is preferably a condensation product of diethanolamine and an aliphatic dicarboxylic acid, particularly preferably a condensation product of diethanolamine and adipic acid or a condensation product of diethanolamine and itaconic acid.

Examples of the water-soluble nitrogen-containing compound include polyvinylpyrrolidone, polyethyleneimine, polyoxyethylene alkylamine, polydialkylaminoalkyl (meth) acrylate, polydialkylaminoalkyl (meth)acrylamide, polyacrylamide, polycationic acrylamide, polyamine sulfone, and polyallylamine.

Examples of the polydialkylaminoalkyl (meth)acrylate include polydimethylaminoethyl methacrylate and polydimethylaminoethyl acrylate.

Examples of the polydialkylaminoalkyl (meth)acrylamide include polydimethylaminopropyl acrylamide and polydimethylaminopropyl methacrylamide. Preferred among these is polyvinylpyrrolidone.

The amount of the colloidal silica added is appropriately decided according to the particle size of the thermally expandable microcapsules. The lower limit of the amount the colloidal silica added relative to 100 parts by weight of the monomers is preferably 1 part by weight, and the upper limit thereof is preferably 20 parts by weight. The lower limit is more preferably 2 parts by weight, and the upper limit is more preferably 10 parts by weight. The amount of the condensation product or the water-soluble nitrogen-containing compound added is also decided according to the particle size of the thermally expandable microcapsules. The lower limit of the amount relative to 100 parts by weight of the monomers is preferably 0.05 parts by weight, and the upper limit thereof is preferably 2 parts by weight.

In addition to the dispersion stabilizer and the auxiliary stabilizer, an inorganic salt such as sodium chloride or sodium sulfate may be added. Adding an inorganic salt allows the resulting thermally expandable microcapsules to have a more uniform particle shape. The amount of the inorganic salt added is usually preferably 0 to 100 parts by weight relative to 100 parts by weight of the monomers.

The aqueous dispersion medium containing the dispersion stabilizer is prepared by adding the dispersion stabilizer and the auxiliary stabilizer to deionized water. The pH of the aqueous phase is appropriately decided according to the type of the dispersion stabilizer and the auxiliary stabilizer to be used. For example, when silica such as colloidal silica is used as the dispersion stabilizer, polymerization is performed in an acidic medium. The aqueous medium is made acidic by adjusting the pH of the system to 3 to 4 by adding an acid such as hydrochloric acid as needed. When magnesium hydroxide or calcium phosphate is used, polymerization is performed in an alkaline medium.

In the method for producing the thermally expandable microcapsules, next, the step of dispersing an oily mixture in the aqueous medium is performed. The oily mixture contains 40 to 90% by weight of the polymerizable monomer (I), 5 to 50% by weight of the radically polymerizable unsaturated carboxylic acid monomer (II) having a carboxy group and having a carbon number of 3 to 8, and a volatile expansion agent. In this step, the monomers and the volatile expansion agent may be separately added to the aqueous dispersion medium to prepare the oily mixture in the aqueous dispersion medium. Typically, however, the monomers and the volatile expansion agent are mixed in advance to form the oily mixture, and the obtained oily mixture is added to the aqueous dispersion medium. In this case, the oily mixture and the aqueous dispersion medium may be prepared in separate containers in advance, mixed in another container with stirring to disperse the oily mixture in the aqueous dispersion medium, and then added to the polymerization reaction container.

The polymerization initiator is used to polymerize the monomers. The polymerization initiator may be added to the oily mixture in advance, or may be added after the aqueous dispersion medium and the oily mixture are mixed with stirring in the polymerization reaction container.

The oily mixture may be emulsified to a predetermined particle size in the aqueous dispersion medium by, for example, a method including stirring with a homomixer (e.g., produced by Tokushu Kika Kogyo Co., Ltd.), or a method including passing the oily mixture and the aqueous dispersion medium through a static dispersion apparatus such as a line mixer or an element-type static dispersion machine.

Here, the aqueous dispersion medium and the polymerizable mixture may be separately fed to the static dispersion apparatus, or a dispersion obtained by mixing and stirring in advance may be fed to the dispersion apparatus.

The thermally expandable microcapsules can be produced by performing the step of polymerizing the monomers by, for example, heating the dispersion obtained through the above steps. Thermally expandable microcapsules produced by such a method have a high maximum foaming temperature and excellent heat resistance, and neither break nor shrink in a high temperature range or during molding processing.

The upper limit of the density of the foam of the present invention is preferably 0.65 g/cm$^3$. The foam having a density of 0.65 g/cm$^3$ or smaller can be very lightweight.

The upper limit of the density is preferably 0.63 g/cm$^3$, more preferably 0.60 g/cm$^3$. The lower limit thereof is preferably, but not limited to, 0.2 g/cm$^3$.

The density can be measured by a method in conformity with JIS K 7112 Method A (water displacement method).

The upper limit of the average surface roughness (Ra) of the foam of the present invention is preferably 5 μm. The foam having an average surface roughness of 5 μm or smaller can have high appearance quality. A smoother average surface roughness is more preferable. The upper limit thereof is preferably 4.5 μm, more preferably 4 μm. The lower limit thereof is preferably, but not limited to, 0.2 μm. The average surface roughness (Ra) can be measured by measuring the surface roughness (Ra) of the surface of the molded body using a 3D shape measuring device (produced by Keyence Corporation, VR-3000).

The upper limit of the compression set at 70° C. of the foam of the present invention is preferably 45%. The foam having a compression set at 70° C. of 45% or smaller can be suitable particularly as a sealing material for automobiles, particularly a part of a glass run channel against which window glass slides. The compression set at 70° C. is preferably 40% or smaller. The lower limit of the compression set at 70° C. is not limited, but is practically 0%. For example, the lower limit is 20%.

The compression set at 70° C. means "residual strain" of a specimen caused by compressing the specimen at a predetermined proportion using a compression plate and holding the specimen in an environment of 70° C. for predetermined time (e.g., 22 hours).

Examples of applications of the foam having high surface appearance quality of the present invention include automobile interior materials such as door trims, instrument panels, and weatherstrips of glass run channels, and automobile exterior materials such as bumpers. Examples also include: building material applications such as wood plastic composites; shoe soles; synthetic corks; and housing interior parts such as multilayer heat insulation pipes, including three-layer pipes. In particular, low water absorption is required in piping and other applications in which water passes through pipes. A small cell diameter (40 to 60 μm) allows a foam layer to maintain low water absorption.

The method for producing the foam of the present invention is not limited. For example, a preferred method includes mixing the elastomer resin with the thermally expandable microcapsules and putting the mixture in a molding machine or the like to perform foam molding. Another preferred method includes heat-kneading the thermally expandable microcapsules with a base resin for masterbatch, such as polyethylene or an ethylene-vinyl acetate copolymer, to prepare pellet-shaped masterbatch, then mixing the masterbatch with the elastomer resin, and putting the mixture in a molding machine or the like to perform foam molding.

The foam molding is performed by any method. Examples of the method include extrusion molding, injection molding, and press molding. The foam molding may be performed with a screw of any shape at any screw rotation rate. The shape and the rotation rate of the screw may be appropriately designed in consideration with the shear force caused by the screw rotation and the residence time.

The foam of the present invention is preferably produced by extrusion molding. In particular, the foam is preferably produced using a method including steps of: preparing a composition for foam molding containing thermally expandable microcapsules having an average particle size of 10 to 20 μm and an elastomer resin; and extrusion-molding the composition for foam molding, the step of extrusion molding being performed at a depressurizing speed in a die of an extrusion molding machine of 10 MPa/cm or greater.

Using such a method makes it possible to suitably produce a foam containing cells that have an average diameter of 40 to 60 μm and an average circularity of 0.99 or greater.

In the production method, the thermally expandable microcapsules preferably have an average particle size of 10 to 20 μm, more preferably 12 to 18 μm.

In the production of the foam of the present invention, the amount of the thermally expandable microcapsules added is not limited. The lower limit of the amount relative to 100 parts by weight of the elastomer resin is preferably 3 parts by weight, and the upper limit thereof is preferably 8 parts by weight.

In the production method, the depressurizing speed in the die of the extrusion molding machine is preferably 10 MPa/cm or greater. This can improve the surface appearance and the compression set of the molded article. The depressurizing speed in the die is the value obtained by calculating the pressure at the die inlet from the melt viscosity data of the resin measured with Capilograph and from extrusion molding conditions, and dividing the pressure by the die length.

In the production of the foam of the present invention, a chemical foaming agent that decomposes with heat to generate gas, such as azodicarbonamide, may be added in addition to the thermally expandable microcapsules as long as the effects of the present invention are not impaired.

To avoid impairing the fatigue resistance of the foam against repeated compression, the upper limit of the amount of the chemical foaming agent added relative to 100 parts by weight of the thermally expandable microcapsules is preferably 50 parts by weight.

The chemical foaming agent may be any chemical foaming agent that is powdery at room temperature, and may be a conventional, common chemical foaming agent. Specific examples thereof include inorganic chemical foaming agents such as sodium hydrogen carbonate and organic chemical foaming agents such as azodicarbonamide, N,N'-dinitrosopentamethylenetetramine, P,P'-oxybisbenzenesulfonylhydrazide, and paratoluenesulfonylhydrazide.

In the production of the foam of the present invention, additives such as lubricants may be added as long as the effects of the present invention are not impaired. Adding a lubricant reduces the shear applied to the thermally expandable microcapsules, so that slight foaming is less likely to occur. Adding a lubricant also improves the dispersibility of the thermally expandable microcapsules.

The lubricant may be any lubricant that dissolves at a temperature during production, and may be a conventional, common lubricant. Specific examples thereof include polyethylene wax having a viscosity average molecular weight of 3,000 or less, glycerol fatty acid esters such as glycerol monostearate and diglycerol stearate, fatty acids such as stearic acid, and composite lubricants.

Advantageous Effects of Invention

The present invention can provide a foam that is less likely to deflate even after prolonged or repeated load application, has low density, and has good appearance quality. The present invention can also provide a method for producing the foam.

DESCRIPTION OF EMBODIMENTS

Embodiments of the present invention are more specifically described in the following with reference to, but not limited to, examples.

(Production of Thermally Expandable Microcapsule)

A polymerization reaction container was charged with 300 parts by weight of water, 89 parts by weight of sodium chloride as an adjustor, 0.07 parts by weight of sodium nitrite as a water-soluble polymerization inhibitor, 8 parts by weight of colloidal silica (produced by Asahi Denka) as a dispersion stabilizer, and 0.3 parts by weight of polyvinylpyrrolidone (produced by BASF), whereby an aqueous dispersion medium was prepared. Subsequently, the aqueous dispersion medium was mixed with an oily mixture containing a metal salt, monomers, a volatile expansion agent, and a polymerization initiator in the amounts shown in Table 1, whereby a dispersion was prepared. The total dispersion was 15 kg. The obtained dispersion was stirred and mixed with a homogenizer, fed to a pressure polymerization vessel (20 L) purged with nitrogen, pressurized (0.2 MPa), and reacted at 60° C. for 20 hours to give a reaction product. The obtained reaction product was repeatedly dehydrated and water-washed with a centrifuge, and dried to give thermally expandable microcapsules (Nos. 1 to 3). The amount of colloidal silica added to the thermally expandable microcapsules was as shown in Table 1.

In Table 1, the polymerizable monomer (I) is denoted as Monomer (I), the radically polymerizable unsaturated carboxylic acid monomer (II) as Monomer (II), and the polymerizable monomer (III) as Monomer (III).

Examples 1 to 6 and Comparative Examples 1 to 6

An amount of 95 parts by weight of a resin and 5 parts by weight of thermally expandable microcapsules of the types shown in Table 2 were mixed in an extrusion molding machine (GT-40, produced by Research Laboratory of Plastics Technology Co., Ltd.) and extrusion-molded at a resin temperature of 200° C., a residence time of 1 minute, a screw rotation rate of 60 rpm, and a maximum pressure shown in Table 2, whereby a foam having a thickness shown in Table 2 was obtained. In Table 2, "Milastomer" denotes Milastomer 7030BS (elastomer resin, produced by Mitsui Chemicals, Inc.), "Non-crosslinked TPO" denotes EXCELINK 3700B (produced by JSR), and "Styrenic (thermoplastic elastomer)" denotes AR-1060 (produced by Aronkasei Co., Ltd.). The Milastomer 7030BS is an olefinic thermoplastic vulcanizate (TPV) having a sea-island structure composed of a sea phase of PP and an island phase of crosslinked EPDM. The EXCELINK 3700B is an elastomer matrix crystalline pseudo-crosslink type TPO (non-crosslinked TPO) in which a polyolefin resin forms a network structure in an EP rubber matrix. The AR-1060 is a styrene-ethylene/butene-styrene block copolymer (SEBS). Table 2 includes (TMA) (TMA2940, produced by TA Instruments). Specifically, 25 μg of a sample was placed in an aluminum container having a diameter of 7 mm and a depth of 1 mm, and heated at a heating rate of 5° C./min from 80° C. to 220° C. with a force of 0.1 N applied from the top. The displacement of a measuring terminal in the perpendicular direction was measured. The temperature at which the displacement began to increase was defined as the foaming starting temperature. The maximum value of the displacement was defined as the maximum displacement. The temperature at which the maximum displacement was obtained was defined as the maximum foaming temperature.

TABLE 1

| Thermally expandable microcapsule No. | | | | No. 1 | No. 2 | No. 3 |
|---|---|---|---|---|---|---|
| Thermally expandable microcapsule | Amount of oily dispersion medium (parts by weight) | Monomer (I) | Acrylonitrile | 20 | 20 | 20 |
| | | | Methacrylonitrile | 30 | 30 | 30 |
| | | Monomer (II) | Methacrylic acid | 30 | 30 | 30 |
| | | Monomer (III) | Trimethylolpropane trimethacrylate | 0 | 0 | 0 |
| | | | Trimethylolpropane triacrylate | 0 | 0 | 0 |
| | | Metal salt (IV) | Zinc hydroxide | 1.5 | 1.5 | 1.5 |
| | | Other monomers | Methyl methacrylate | 20 | 20 | 20 |
| | | Volatile expansion agent | Isopentane | 15 | 15 | 15 |
| | | | Isooctane | 10 | 10 | 10 |
| | | Polymerization initiator | 2,2'-Azobisisobutyronitrile | 0.8 | 0.8 | 0.8 |
| | | | 2,2'-Azobis(4-methoxy-2,4-dimethylvaleronitrile) | 0.6 | 0.6 | 0.6 |
| | Amount of aqueous dispersion medium (parts by weight) | Water | | 300 | 300 | 300 |
| | | Sodium chloride | | 89 | 89 | 89 |
| | | Sodium nitrite | | 0.07 | 0.07 | 0.07 |
| | | Colloidal silica | | 12.5 | 7.5 | 11 |
| | | Polyvinylpyrrolidone | | 0.3 | 0.3 | 0.3 |
| | Evaluation | Average particle size (μm) | | 18 | 26 | 20 |
| | | Foaming starting temperature (Ts) (° C.) | | 179 | 175 | 177 |
| | | Maximum foaming temperature (Tmax) (° C.) | | 220 | 216 | 220 |
| | | Maximum displacement (Dmax) (μm) | | 650 | 950 | 730 | the details of the screw configuration (sub flight type, full flight type), the pressure before the die [MPa], the die outlet thickness [mm], and the depressurizing speed [MPa/cm].

The depressurizing speed is the value obtained by calculating the pressure at the die inlet from the melt viscosity data of the resin measured with Capilograph (Toyo Seiki Seisaku-Sho, Ltd. Capilograph 1B) under the following conditions and from extrusion molding conditions, and dividing the pressure by the die length.
[Capilograph Measurement Conditions]
  test temperature: 180° C., 190° C., 200° C.
  capillary length: 1 mm, capillary diameter: 1 mm
  piston speed (mm/min): 0.5 to 300
(Evaluation)

The thermally expandable microcapsules (Nos. 1 to 3) and the foams obtained in Example 1 to 6 and Comparative Examples 1 to 6 were evaluated for the following performances. Table 1 and Table 2 show the results.
(1) Evaluation of Thermally Expandable Microcapsules
(1-1) Volume Average Particle Size The volume average particle size was measured with a particle size distribution analyzer (LA-910, produced by HORIBA, Ltd.).
(1-2) Foaming Starting Temperature, Maximum Foaming Temperature, and Maximum Displacement The foaming starting temperature (Ts), maximum displacement (Dmax), and maximum foaming temperature (Tmax) were measured with a thermomechanical analyzer (2) Evaluation of Cells
(2-1) Average Diameter The obtained foam was cut with a razor. The obtained cross section was sputtered with platinum and then observed with an electron microscope. For randomly selected 100 cells (air bubbles), the major axis and the minor axis of each projected air bubble were measured, and the average diameter was calculated by the method below. Here, the average diameter was measured for the cells in the entire cross section. The CV value (%) of the average diameter was shown in Table 2.

Average diameter: the diameter of each air bubble was determined from the average of the major axis and minor axis, and then the average of the diameters was calculated to determine the average diameter.
(2-2) Average Circularity A cross section was observed with an electron microscope in the same manner as in "(2-1) Average diameter". For randomly selected 100 cells (air bubbles) in the surface layer (portion from the surface to a depth of 100 μm) and randomly selected 100 cells in the center portion (portion other than the surface layer), the area (projected area) and the perimeter of each projected air bubble were measured, and the average circularity was calculated by the method below. Here, the average circularity was calculated for the surface layer and the center portion separately, and then the average circularity for the entire foam was calculated according to the cross-sectional area ratio between the surface layer and the center portion.

Average circularity: the circularity of each air bubble was determined from the area (A) and the perimeter (B) according to the following equation, and the average was calculated to determine the average circularity. Circularity=$4\pi A/B^2$ Moreover, the projected areas and the perimeters measured above were averaged over the entire foam. The results were shown in Table 2 as the average projected area and the average perimeter.

(2-3) Average Minor-to-Major Axis Ratio

A cross section was observed with an electron microscope in the same manner as in "(2-1) Average diameter". For randomly selected 100 cells (air bubbles) in the surface layer (portion from the surface to a depth of 100 μm) and randomly selected 100 cells in the center portion (portion other than the surface layer), the major axis and the minor axis of each projected air bubble were measured, and the average minor-to-major axis ratio was calculated by the method below. Here, the average minor-to-major axis ratio was calculated for the surface layer and the center portion separately, and then the average minor-to-major axis ratio for the entire foam was calculated according to the cross-sectional area ratio between the surface layer and the center portion.

Average minor-to-major axis ratio: the minor-to-major axis ratio of each air bubble was determined from minor axis/major axis, and the average was calculated to determine the average minor-to-major axis ratio.

(3) Evaluation of Foam (3-1) Thickness Measurement

The thickness of the obtained foam was measured using a caliper (produced by Mitutoyo Corporation, CD-S10C). Here, the thickness was measured by measuring the length from one surface of the foam at any position to the other surface in the tangential direction.

(3-2) Density Measurement

The density of the foam was measured by a method in conformity with JIS K 7112 Method A (water displacement method) with a densimeter MD-200S (produced by Alfa Mirage, Co., Ltd.).

(3-3) Surface Roughness

The surface roughness (Ra) of the foam surface was measured using a 3D shape measuring device (produced by Keyence Corporation, VR-3000).

(3-4) Compression Set Measurement

The compression set of the obtained foam was measured by a method in conformity with JIS K6262 under the conditions of 70° C., 22 hours, and 25% compression.

TABLE 2

| | | | Example 1 | Example 2 | Example 3 | Example 4 | Example 5 |
|---|---|---|---|---|---|---|---|
| Formulation | Resin | Type | Milastomer | Milastomer | Milastomer | Non-crosslinked TPO | Styrenic thermoplastic elastomer |
| | | Amount [% by weight] | 95.0 | 95.0 | 95.0 | 95.0 | 95.0 |
| | Thermally expandable microcapsule | Type | No. 1 | No. 1 | No. 1 | No. 1 | No. 1 |
| | | Amount [% by weight] | 5.0 | 5.0 | 5.0 | 5.0 | 5.0 |
| Molding conditions | Resin temperature [° C.] | | 200 | 200 | 200 | 200 | 200 |
| | Rotation rate [rpm] | | 60 | 60 | 90 | 60 | 60 |
| | Screw configuration | | Sub flight | Full flight | Sub flight | Sub flight | Sub flight |
| | Maximum pressure [MPa] | | 18.4 | 28.4 | 25.4 | 17.3 | 17.8 |
| | Pressure before die | (Screw tip pressure) | 9.5 | 8 | 9 | 9.3 | 8.6 |
| | Die structure | Die outlet thickness [mm] | 0.8 | 0.8 | 0.8 | 0.8 | 0.8 |
| | Pressure gradient | Depressurizing speed [MPa/cm] | 15.04 | 14.1 | 14.6 | 15.12 | 14.02 |
| Cell evaluation | Average diameter | Measured value [μm] | 47.54 | 47.51 | 46.50 | 47.44 | 44.64 |
| | | CV [%] | 20.23 | 22.36 | 27.30 | 21.89 | 22.23 |
| | Average circularity | Entire foam | 0.993 | 0.993 | 0.993 | 0.996 | 0.995 |
| | | Surface layer | 0.985 | 0.985 | 0.984 | 0.988 | 0.987 |
| | | Center portion | 0.995 | 0.995 | 0.995 | 0.997 | 0.997 |
| | Average minor-to-major axis ratio | Entire foam | 0.905 | 0.902 | 0.905 | 0.904 | 0.893 |
| | | Surface layer | 0.849 | 0.813 | 0.823 | 0.833 | 0.828 |
| | | Center portion | 0.918 | 0.923 | 0.925 | 0.921 | 0.908 |
| | Average projected area | Entire foam [μm$^2$] | 1775 | 1773 | 1698 | 1768 | 1565 |
| | Average perimeter | Entire foam [μm] | 149.9 | 149.8 | 146.6 | 149.6 | 140.8 |
| Foam evaluation | Thickness [μm] | | 1050 | 1040 | 1040 | 1060 | 1060 |
| | Density [g/cm$^3$] | | 0.598 | 0.631 | 0.626 | 0.615 | 0.608 |
| | Surface roughness (Ra) [μm] | | 4.04 | 3.66 | 3.86 | 3.75 | 3.91 |
| | Compression set [%] | | 38.1 | 43.1 | 42.1 | 40.0 | 41.4 |

| | | | Example 6 | Comparative Example 1 | Comparative Example 2 | Comparative Example 3 |
|---|---|---|---|---|---|---|
| Formulation | Resin | Type | Milastomer | Milastomer | Milastomer | Milastomer |
| | | Amount [% by weight] | 95.0 | 95.0 | 95.0 | 95.0 |
| | Thermally expandable microcapsule | Type | No. 3 | No. 2 | No. 2 | No. 2 |
| | | Amount [% by weight] | 5.0 | 5.0 | 5.0 | 5.0 |
| Molding conditions | Resin temperature [° C.] | | 200 | 200 | 200 | 190 |
| | Rotation rate [rpm] | | 60 | 60 | 90 | 60 |
| | Screw configuration | | Sub flight | Sub flight | Sub flight | Sub flight |

TABLE 2-continued

|  |  |  |  |  |  |  |
|---|---|---|---|---|---|---|
|  | Maximum pressure [MPa] |  | 16.3 | 16.5 | 11.8 | 17.2 |
|  | Pressure before die | (Screw tip pressure) | 8.7 | 7.3 | 8.1 | 7.7 |
|  | Die structure | Die outlet thickness [mm] | 0.8 | 1.4 | 1.4 | 1.4 |
|  | Pressure gradient | Depressurizing speed [MPa/cm] | 13.89 | 6.46 | 6.87 | 7 |
| Cell evaluation | Average diameter | Measured value [μm] | 58.42 | 85.18 | 82.12 | 83.31 |
|  |  | CV [%] | 26.23 | 27.28 | 28.28 | 25.16 |
|  | Average circularity | Entire foam | 0.996 | 0.993 | 0.994 | 0.994 |
|  |  | Surface layer | 0.989 | 0.972 | 0.986 | 0.982 |
|  |  | Center portion | 0.997 | 0.995 | 0.995 | 0.995 |
|  | Average minor-to-major axis ratio | Entire foam | 0.902 | 0.878 | 0.910 | 0.910 |
|  |  | Surface layer | 0.839 | 0.760 | 0.878 | 0.839 |
|  |  | Center portion | 0.916 | 0.892 | 0.914 | 0.919 |
|  | Average projected area | Entire foam [μm²] | 2680 | 5699 | 5296 | 5451 |
|  | Average perimeter | Entire foam [μm] | 184.2 | 268.6 | 258.8 | 262.6 |
| Foam evaluation | Thickness [μm] |  | 1070 | 1870 | 1860 | 1860 |
|  | Density [g/cm³] |  | 0.552 | 0.477 | 0.48 | 0.462 |
|  | Surface roughness (Ra) [μm] |  | 4.92 | 39.66 | 27.86 | 23.97 |
|  | Compression set [%] |  | 41.5 | 55.7 | 47.0 | 47.4 |

|  |  |  |  | Comparative Example 4 | Comparative Example 5 | Comparative Example 6 |
|---|---|---|---|---|---|---|
| Formulation | Resin | Type |  | Milastomer | Milastomer | Milastomer |
|  |  | Amount [% by weight] |  | 95.0 | 95.0 | 95.0 |
|  | Thermally expandable microcapsule | Type |  | No. 1 | No. 2 | No. 2 |
|  |  | Amount [% by weight] |  | 5.0 | 5.0 | 5.0 |
| Molding conditions | Resin temperature [° C.] |  |  | 200 | 200 | 200 |
|  | Rotation rate [rpm] |  |  | 60 | 60 | 60 |
|  | Screw configuration |  |  | Sub flight | Sub flight | Full flight |
|  | Maximum pressure [MPa] |  |  | 16.2 | 16.6 | 24.8 |
|  | Pressure before die | (Screw tip pressure) |  | 7.5 | 8.9 | 8.1 |
|  | Die structure | Die outlet thickness [mm] |  | 1.4 | 0.8 | 0.8 |
|  | Pressure gradient | Depressurizing speed [MPa/cm] |  | 6.39 | 14.98 | 13.97 |
| Cell evaluation | Average diameter | Measured value [μm] |  | 47.67 | 80.8 | 85.4 |
|  |  | CV [%] |  | 20.04 | 28.36 | 26.08 |
|  | Average circularity | Entire foam |  | 0.988 | 0.994 | 0.991 |
|  |  | Surface layer |  | 0.973 | 0.996 | 0.981 |
|  |  | Center portion |  | 0.990 | 0.994 | 0.992 |
|  | Average minor-to-major axis ratio | Entire foam |  | 0.906 | 0.895 | 0.885 |
|  |  | Surface layer |  | 0.822 | 0.886 | 0.865 |
|  |  | Center portion |  | 0.916 | 0.897 | 0.890 |
|  | Average projected area | Entire foam [μm²] |  | 1785 | 5125 | 5733 |
|  | Average perimeter | Entire foam [μm] |  | 150.7 | 254.5 | 269.7 |
| Foam evaluation | Thickness [μm] |  |  | 1875 | 1080 | 1060 |
|  | Density [g/cm³] |  |  | 0.56 | 0.499 | 0.469 |
|  | Surface roughness (Ra) [μm] |  |  | 5.9 | 11.61 | 13.69 |
|  | Compression set [%] |  |  | 40.1 | 48.5 | 56.6 |

INDUSTRIAL APPLICABILITY

The present invention can provide a foam that is less likely to deflate even after prolonged or repeated load application, has low density, and has good appearance quality. The foam of the present invention, having low water absorption, can be suitably used as a foam layer of a pipe or the like in an application such as piping in which water passes through pipes. The present invention can also provide a method for producing the foam.

The invention claimed is:

1. A foam comprising cells dispersed in an elastomer resin,
the cells having an average diameter of 40 to 60 μm and an average circularity of 0.990 or greater,
wherein the foam has a thickness of 300 μm or greater,
the foam has a surface layer that is a portion from a surface to a depth of 100 μm and a center portion that is a portion other than the surface layer,
the cells in the surface layer have an average circularity of 0.980 or greater,
the cells in the center portion have an average circularity of 0.990 or greater, and
the average circularity is a value obtained by cutting the foam to provide a cross section, subjecting the cross section to an image analysis and measuring a circularity of multiple cells, and then averaging the measured circularities of the multiple cells.

2. The foam according to claim 1,
wherein the cells of the foam are formed by thermal expansion of thermally expandable microcapsules,
the thermally expandable microcapsules each comprising:
a shell comprising a polymer, and a volatile liquid as a core agent encapsulated by the shell.

3. The foam according to claim 1,
wherein the foam has an average surface roughness (Ra) of 5 μm or smaller, as measured with a 3D shape measuring device.

4. The foam according to claim 1,
wherein the foam has a compression set at 70° C. of 45% or smaller, wherein the compression set at 70° C. means a residual strain of a specimen of the foam caused by compressing the specimen at a predetermined portion using a compression plate and holding the specimen in an environment of 70° C. for 22 hours.

5. The foam according to claim 1,
wherein the elastomer resin is a thermoplastic olefinic elastomer.

6. A method for producing the foam according to claim 1, comprising steps of:
preparing a composition for foam molding containing thermally expandable microcapsules having an average particle size of 10 to 20 μm and an elastomer resin; and
extrusion-molding the composition for foam molding,
the step of extrusion molding being performed at a depressurizing speed in a die of an extrusion molding machine of 10 MPa/cm or greater.

* * * * *